(12) United States Patent
Mutsuno

(10) Patent No.: US 12,008,274 B2
(45) Date of Patent: Jun. 11, 2024

(54) INSPECTION SYSTEM, METHOD OF CONTROLLING THE SYSTEM, PRINTING APPARATUS, INSPECTION APPARATUS, AND PROGRAM

(71) Applicant: CANON KABUSHIKI KAISHA, Tokyo (JP)

(72) Inventor: Masahiro Mutsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/934,144

(22) Filed: Sep. 21, 2022

(65) Prior Publication Data

US 2023/0102352 A1   Mar. 30, 2023

(30) Foreign Application Priority Data

Sep. 27, 2021   (JP) .................... 2021-156317

(51) Int. Cl.
*G06F 3/12*   (2006.01)
*G06T 7/00*   (2017.01)

(52) U.S. Cl.
CPC .......... *G06F 3/1208* (2013.01); *G06F 3/1256* (2013.01); *G06T 7/001* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 2011/0179961 A1* | 7/2011 | Yanagawa | ............. | G06F 3/1256 101/483 |
| 2016/0371039 A1* | 12/2016 | Mizuno | .................. | G06F 3/1234 |
| 2017/0032177 A1* | 2/2017 | Suenaga | ................... | G06T 7/74 |

FOREIGN PATENT DOCUMENTS

JP   2019095476 A   6/2019

* cited by examiner

*Primary Examiner* — Darryl V Dottin
(74) *Attorney, Agent, or Firm* — Canon U.S.A., Inc. IP Division

(57) ABSTRACT

In printing of a print job to be inspected using a pre-printed sheet having information printed thereon in advance, control is performed so as not to register a reference image based on image data that is received.

13 Claims, 11 Drawing Sheets

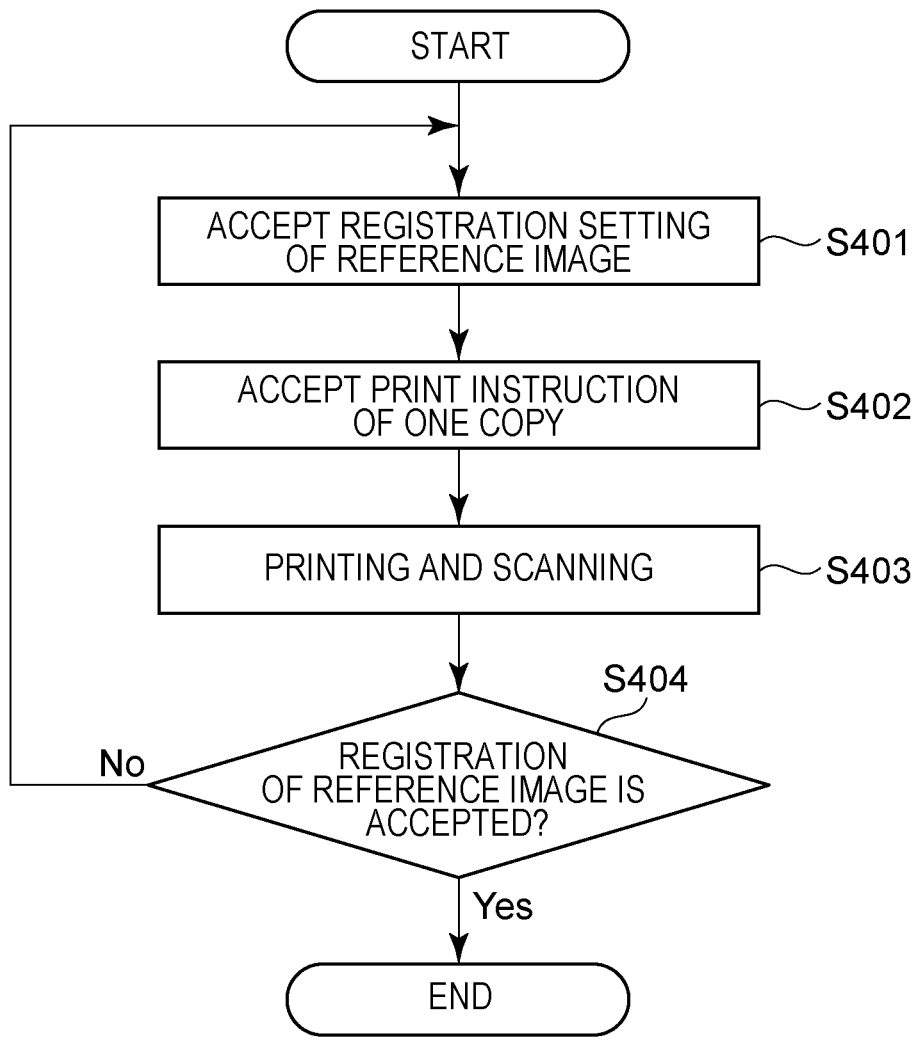

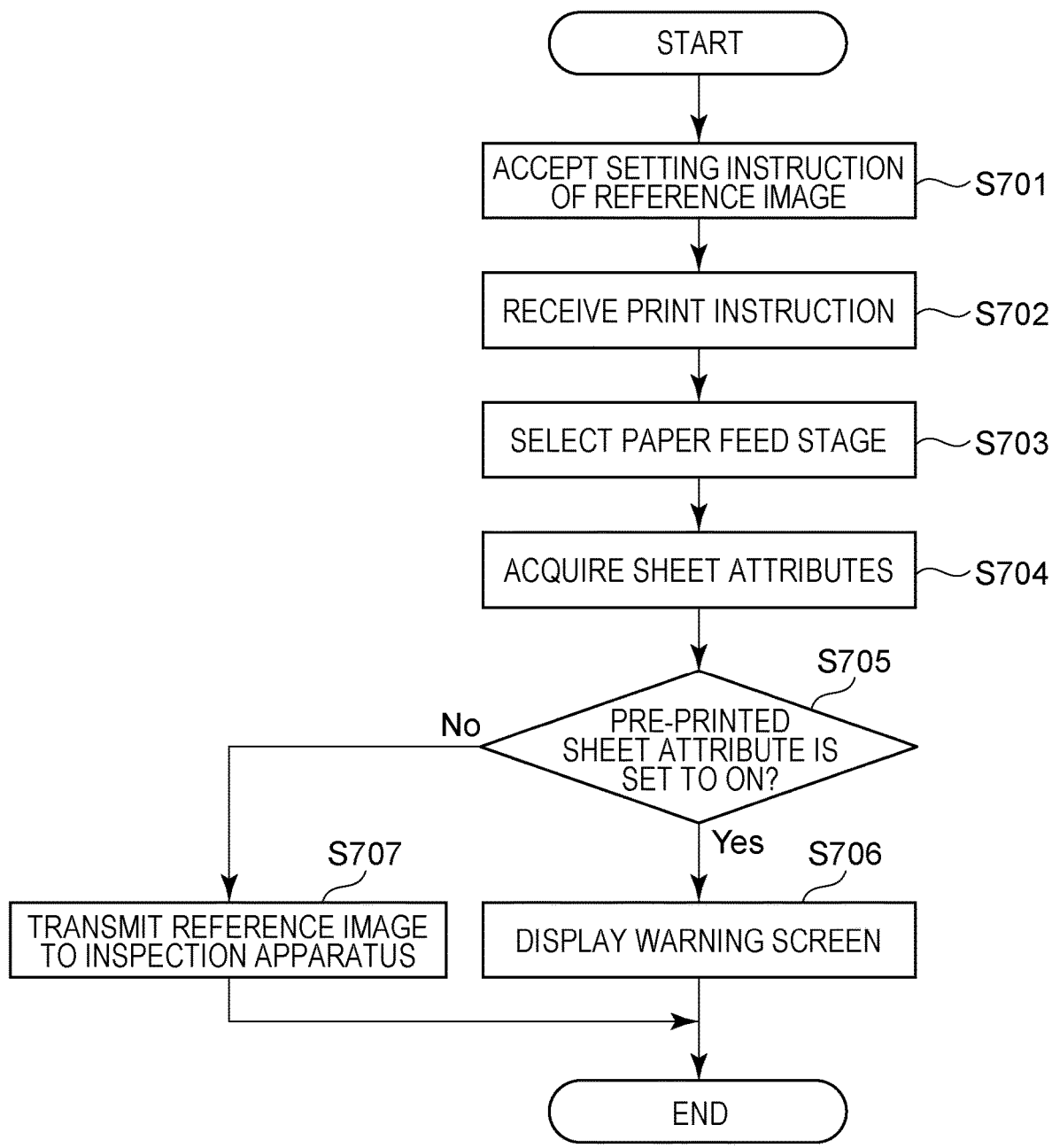

FIG. 9

Sheet inapplicable to RIP inspection is selected.
Use scanning inspection.

OK

INSPECTION SYSTEM, METHOD OF CONTROLLING THE SYSTEM, PRINTING APPARATUS, INSPECTION APPARATUS, AND PROGRAM

BACKGROUND

Field of the Disclosure

The present disclosure relates to an inspection system, a method of controlling the inspection system, a printing apparatus, an inspection apparatus, and a program.

Description of the Related Art

Printing systems capable of inspecting an image printed on a sheet by a printing apparatus with an inspection apparatus during conveyance of the sheet have been known in recent years. In the inspection of such a printed sheet, the inspection apparatus reads an image on the conveyed printed sheet and registers the read image as a reference image. Then, the inspection apparatus analyzes an image on an output material (printed sheet) of a print job that is executed and compares the image on the output material with the reference image to determine whether the output material is normal. It is possible to detect, for example, drop of ruled lines, uncopied spots in an image, and print contamination through the inspection with the inspection apparatus.

In such an inspection system including the inspection apparatus, it is necessary to print an image to be inspected in advance and to register the printed sheet in the inspection apparatus as the reference image read by the inspection apparatus. However, since the printed sheet is read in the registration of the reference image in the inspection system having the above configuration, it is necessary for an operator to visually confirm the printed sheet and whether the registration of the image that is read as the reference image is appropriate. If a large number of sheets are to be printed, the workload of the operator for the confirmation is increased and it takes a lot of time for the confirmation. In addition, an operator's error may occur. Japanese Patent Laid-Open No. 2019-95476 describes comparison of a reference image resulting from registration of raster data generated from print data with image data that is read out from an image to be inspected after being printed to inspect the image that is read out.

However, when the printing is performed using sheets, such as pre-printed sheets, which have additional information, such as ruled lines and/or numerical characters, printed thereon in advance in the inspection process to register the raster data as the reference image, as in Japanese Patent Laid-Open No. 2019-95476, the reference image data has no additional information. Accordingly, the comparison between the image data printed on the pre-printed sheet having the additional information, such as ruled lines and/or numerical characters, printed thereon in advance and the reference image data having no additional information results in determination that the inspection result is not normal.

SUMMARY

In order to resolve the above issue, an inspection system according to an embodiment of the present disclosure has the following configuration.

An inspection system includes a reception unit configured to receive a print job including a sheet attribute and image data; a registration unit configured to register a reference image based on the received image data; and an inspection unit configured to determine whether an image that is printed on a sheet in accordance with the print job and that is read is normal based on the registered reference image. If the sheet attribute indicates a pre-printed sheet having information printed thereon in advance, the registration unit performs control so as not to register the reference image based on the received image data.

Further features of the present disclosure will become apparent from the following description of exemplary embodiments with reference to the attached drawings.

BRIEF DESCRIPTION OF THE DRAWINGS

FIG. 4 is a flowchart for describing a registration process of reference image data in an inspection apparatus in the related art.

FIG. 7 is a flowchart illustrating a reference image registration process according to the present embodiment.

FIG. 9 illustrates a screen to prompt scanning inspection in the present embodiment.

DESCRIPTION OF THE EMBODIMENTS

Figure 1:
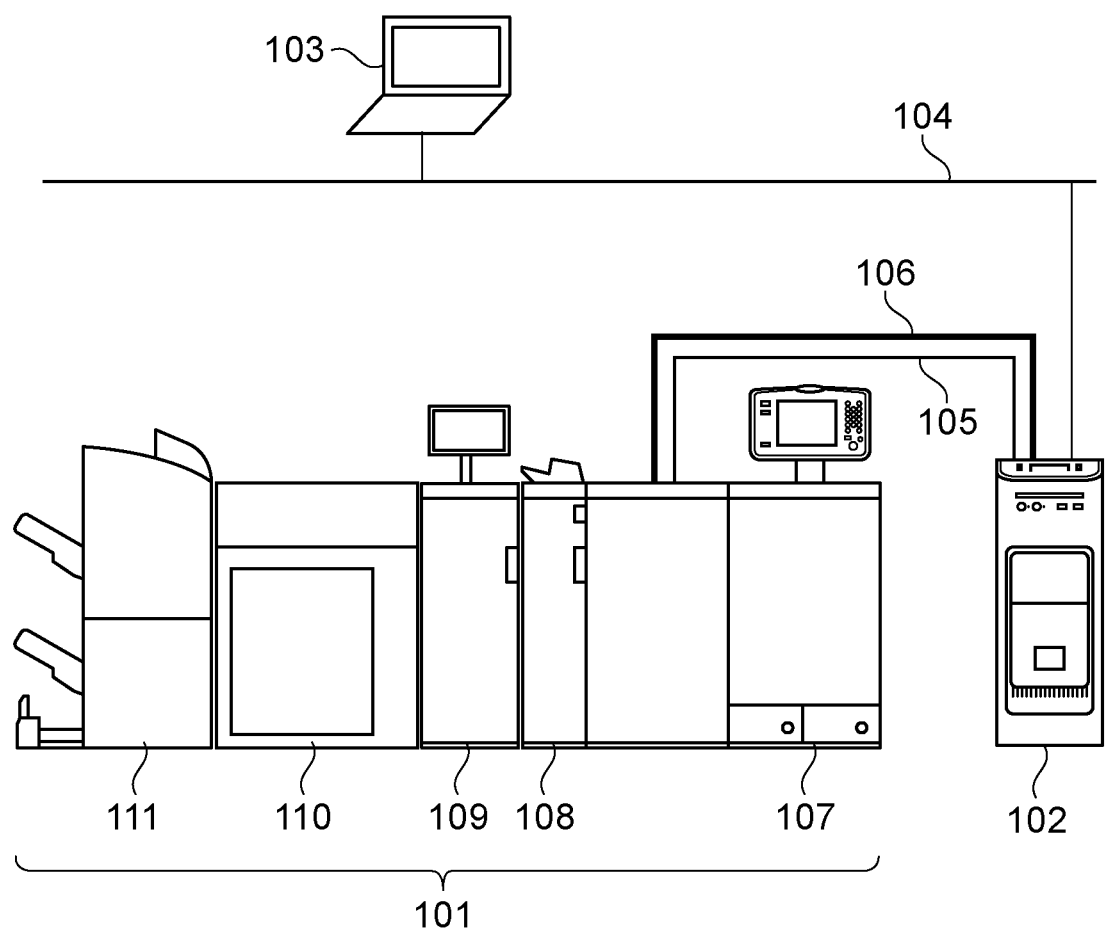
FIG. 1 illustrates the entire configuration of a printing system according to an embodiment of the present disclosure.

Embodiments of the present disclosure will herein be described in detail with reference to the drawings. The embodiments described below do not limit the disclosure according to the scope of the appended claims. Although multiple features are described in the embodiments, all the combinations of the multiple features are not necessarily essential to the present disclosure and the multiple features may be arbitrarily combined. The same reference numerals are added to the same components or similar components in the attached drawings and a duplicated description of such components is omitted herein. In the following description, an external controller may be called an information processing apparatus, an image processing controller, a digital front end, a print server, a DFE, and so on and an image forming apparatus may be called a multifunction apparatus, a multifunction peripheral, and an MFP.

Embodiment

FIG. 1 illustrates the entire configuration of a printing system according to an embodiment.

The printing system includes an image forming apparatus 101 and an external controller 102. The image forming apparatus 101 is connected to the external controller 102 via an internal LAN 105 and a video cable 106 so as to be capable of communication. The external controller 102 is connected to a client personal computer (PC) 103 via an external LAN 104 so as to be capable of communication. A print instruction is capable of being issued from the client PC 103 to the external controller 102.

A printer driver having a function to convert print data into a print description language (for example, a page description language (PDL)) capable of being processed in the external controller 102 is installed in the client PC 103. A user of the client PC 103 is capable of issuing the print instruction from various applications via the printer driver. At this time, the print driver transmits the print data to the external controller 102 based on the print instruction from the user. Upon reception of the print instruction from the client PC 103, the external controller 102 performs analysis and rasterization (raster image processing (RIP)) of the print data to generate image data for printing. The external controller 102 transmits the print data to the image forming apparatus 101 via the internal LAN 105 and transmits the rasterized image data to the image forming apparatus 101 via the video cable 106.

The image forming apparatus 101 will now be described.

Apparatuses having multiple different functions are connected in the image forming apparatus 101, and the image forming apparatus 101 is configured so as to be capable of performing a complicated printing process, such as bookbinding. A printing apparatus 107 forms (prints) an image on a sheet conveyed from a paper feeding unit provided in a lower portion of the printing apparatus 107 using toner. Although the sheet is exemplified here, another material other than the sheet may be used as long as the material is a printing medium. The printing apparatus 107 has the following configuration and operating principle. Specifically, light rays, such as laser beams, which are modulated in accordance with the image data, are reflected by a rotating polygon mirror, such as a polygon mirror, and are applied to a photoconductor drum as scanning light. An electrostatic latent image formed on the photoconductor drum with the laser beams is developed with the toner and a toner image is transferred to a sheet attached to a transfer drum. The series of image forming steps are sequentially performed for the toner of yellow (Y), magenta (M), cyan (C), and black (K) to form a full-color image on the sheet. The sheet on the transfer drum, which has the full-color image formed thereon, is conveyed to a fixing unit. The fixing unit includes a roller, a belt, and so on and includes a heat source, such as a halogen heater, in its roller. The fixing unit dissolves the toner on the sheet, to which the toner images are transferred, with heat and pressure to fix the toner on the sheet.

An inserter 108 is capable of inserting a sheet into a sheet group that is printed in the printing apparatus 107 and that is conveyed at an arbitrary position.

An inspection apparatus 109 reads the image on the conveyed sheet (print) and compares the read image with reference image data (reference image) that is registered in advance to determine whether the printed image is normal. The print is, for example, determined to be a normal print or an error print for discharge.

A large capacity stacker 110 is capable of loading and holding large amounts of sheets. A finisher 111 performs finishing processing to the conveyed sheet. The finishing processing includes stapling, punching, saddle stitch bookbinding, and so on. A sheet bundle subjected to the finishing processing is discharged into a paper discharge tray.

Although the printing system illustrated in FIG. 1 has the configuration in which the external controller 102 is connected to the image forming apparatus 101, the present disclosure is not limited to the above configuration. Specifically, the printing system may have a configuration in which the image forming apparatus 101 is directly connected to the external LAN 104 and the print data is directly transmitted from the client PC 103 to the image forming apparatus 101. In this case, the data analysis and the rasterization are performed in the image forming apparatus 101 for the printing process.

Figure 2A:
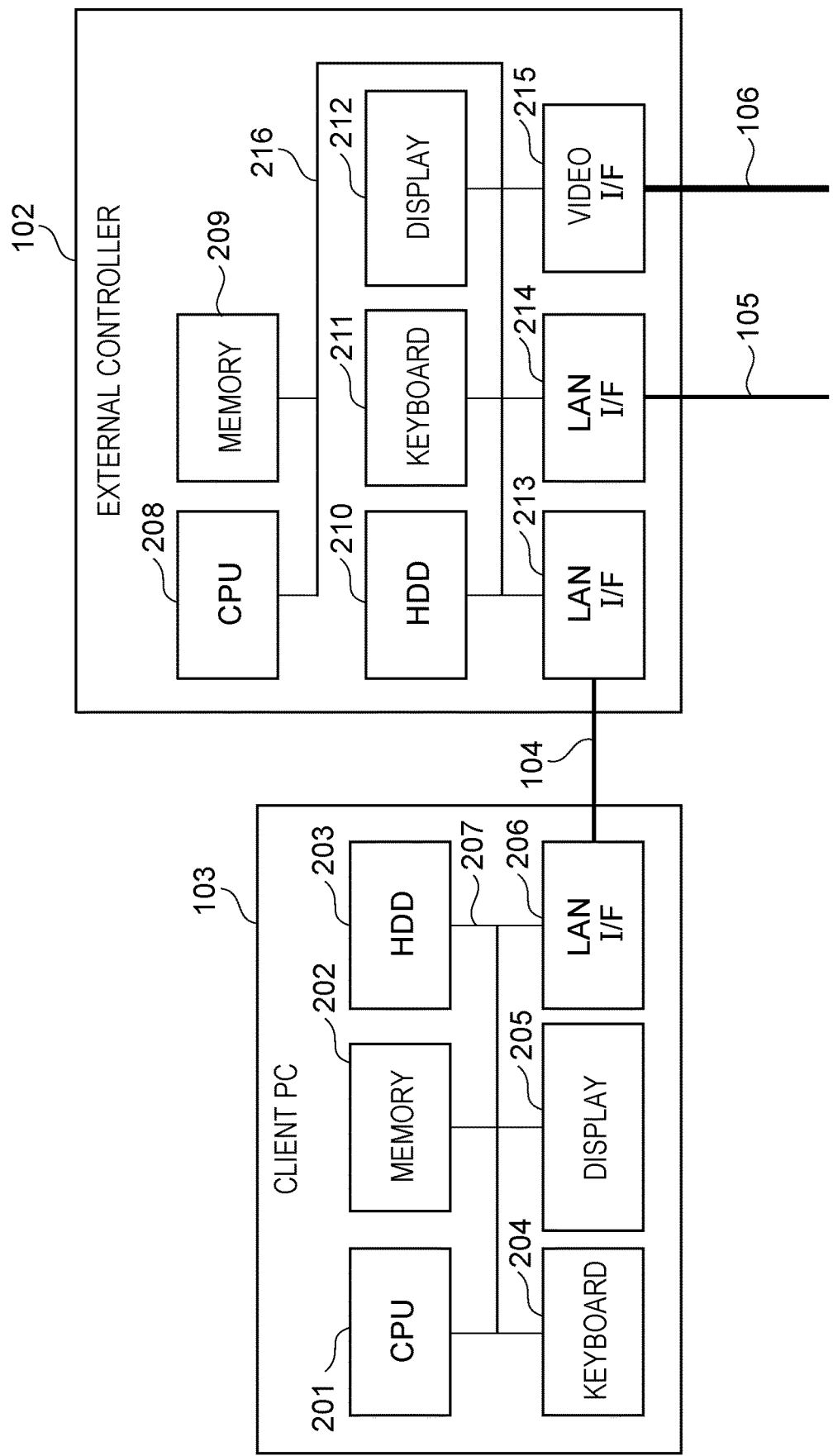
FIG. 2A is a block diagram for describing the hardware configurations of an external controller and a client PC according to the present embodiment.
Figure 2B:
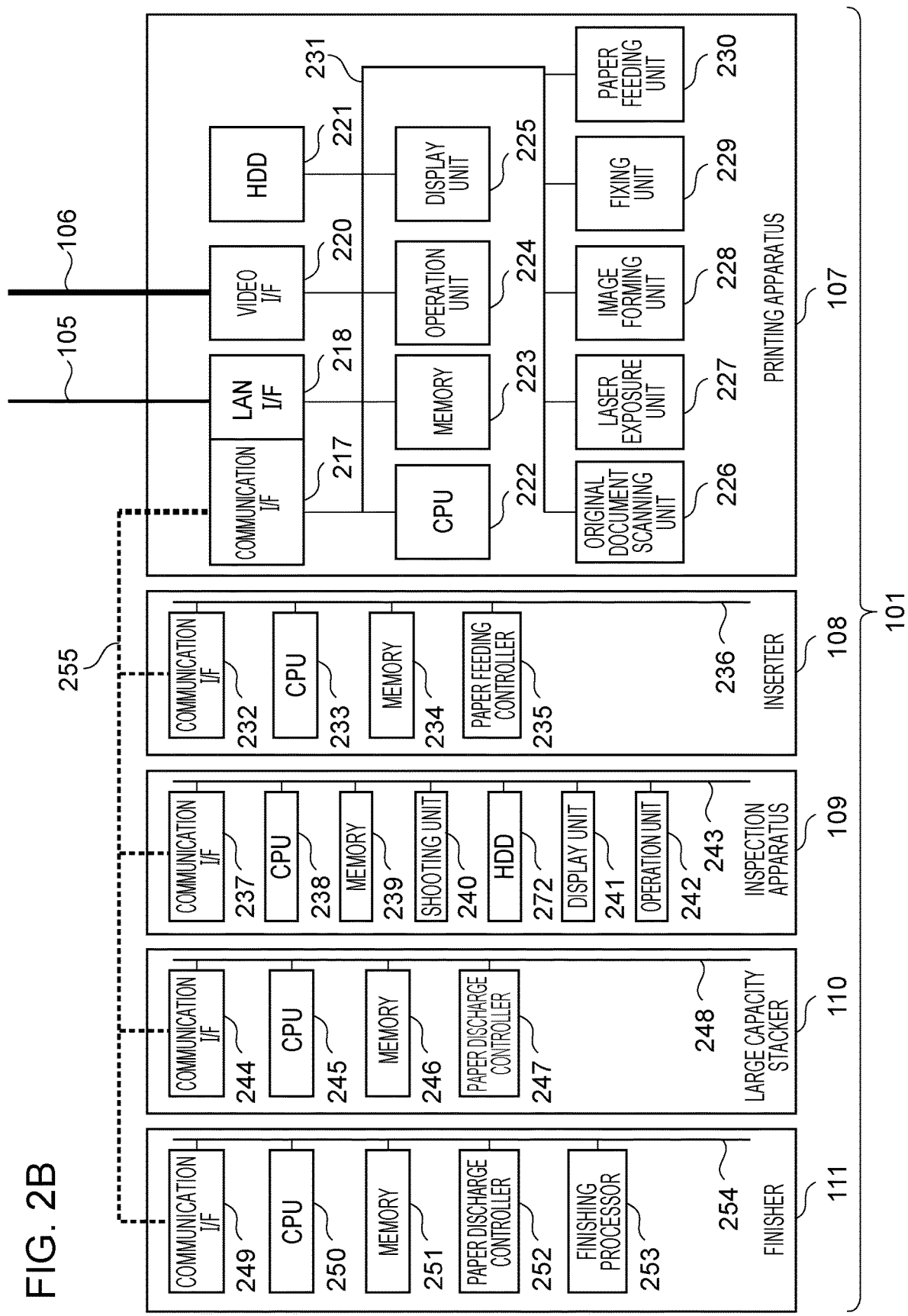
FIG. 2B is a block diagram for describing the hardware configuration of an image forming apparatus according to the present embodiment.

FIG. 2A and FIG. 2B are block diagrams for describing the hardware configurations of the image forming apparatus 101, the external controller 102, and the client PC 103 according to the present embodiment.

The configuration of the external controller 102 will now be described with reference to FIG. 2A.

The external controller 102 includes a central processing unit (CPU) 208, a memory 209, a hard disk drive (HDD) 210, a keyboard 211, a display 212, a local area network (LAN) interface (I/F) 213, a LAN I/F 214, and a video I/F 215, which are connected to each other via a bus 216. The CPU 208 decomposes programs stored in the HDD 210 into the memory 209. The CPU 208 executes the programs decomposed in the memory 209 to perform reception of the print data from the client PC 103, the rasterization (RIP) into bitmap data, transmission of the print data to the image forming apparatus 101, and so on. The memory 209 includes a random access memory (RAM). Programs and data necessary for the CPU 208 to perform a variety of processing are stored in the memory 209, which operates as a working area. Programs and data necessary for operations including the printing process are stored in the HDD 210.

The keyboard 211 is a device used for inputting an operation instruction for the external controller 102. Information about an execution application of the external controller 102 and so on is displayed on the display 212 as a still image or a video signal for a movie. The LAN I/F 213 is connected to the client PC 103 via the external LAN 104 for communication of the print instruction and so on. The LAN I/F 214 is connected to the image forming apparatus 101 via the internal LAN 105 for communication of the print instruction and so on. The video I/F 215 is connected to the image forming apparatus 101 via the video cable 106 for communication of the image data and so on.

The configuration of the client PC 103 will now be described. The client PC 103 includes a CPU 201, a memory 202, an HDD 203, a keyboard 204, a display 205, and a LAN I/F 206, which are connected to each other via a bus 207. The CPU 201 decomposes a document processing program stored in the HDD 203 into the memory 202 and executes the decomposed program to perform generation of the print data and the print instruction. The CPU 201 comprehensively controls the respective devices connected to the bus 207. The memory 202 includes a read only memory (ROM), a RAM, and so on. Programs and data necessary for the CPU 201 to perform a variety of processing are stored in the memory 202, which operates as a working area of the CPU 201. Programs and data necessary for operations including the printing process are stored in the HDD 203. The keyboard 204 is a device used for inputting an operation instruction for the client PC 103. Information about an execution application of the client PC 103 and so on is displayed on the display 205 as a still image or a video signal for a movie. The LAN I/F 206 is connected to the external LAN 104 for communication of the print instruction and so on.

The configuration of the printing apparatus 107, the inserter 108, the inspection apparatus 109, the large capacity stacker 110, and the finisher 111 in the image forming apparatus 101 according to the present embodiment will now be described with reference to FIG. 2B.

The printing apparatus 107 in the image forming apparatus 101 includes a communication I/F 217, a LAN I/F 218, a video I/F 220, an HDD 221, a CPU 222, a memory 223, an operation unit 224, and a display unit 225. The printing apparatus 107 further includes an original document scanning unit 226, a laser exposure unit 227, an image forming unit 228, a fixing unit 229, and a paper feeding unit 230. These components are connected to each other via a bus 231.

The communication I/F 217 is connected to the inserter 108, the inspection apparatus 109, the large capacity stacker 110, and the finisher 111 via a communication cable 255 to perform communication for control of the inserter 108, the inspection apparatus 109, the large capacity stacker 110, and the finisher 111. The LAN I/F 218 is connected to the external controller 102 via the internal LAN 105 for communication of the print instruction and so on. The video I/F 220 is connected to the external controller 102 via the video cable 106 for communication of the image data and so on.

The HDD 221 is a storage device in which programs and data are stored. The CPU 222 decomposes the programs stored in the HDD 221 into the memory 223 and executes the decomposed programs to comprehensively control image processing and printing. The memory 223 includes a ROM and a RAM. Programs and image data necessary for the CPU 222 to perform a variety of processing are stored in the memory 223, which operates as a working area of the CPU 222. The operation unit 224 accepts input of various settings and an operation instruction from the user. Setup information about the image forming apparatus 101, the processing status of a print job, and so on are displayed in the display unit 225.

The original document scanning unit 226 scans an original document in use of a copy function or a scanning function. Specifically, the original document scanning unit 226 captures an image with a charge coupled device (CCD) camera while illuminating a sheet that is set by the user with an exposure lamp to scan original document data. The laser exposure unit 227 performs primary charge for irradiating the photoconductor drum with the laser beams to transfer the toner images and laser exposure. In the laser exposure unit 227, the primary charge is first performed to charge the surface of the photoconductor drum to uniform negative potential. Then, the photoconductor drum is irradiated with the laser beams by a laser driver while adjusting the reflection angle with the polygon mirror. This neutralizes the negative potential of the irradiated portion to form the electrostatic latent image. The image forming unit 228 is a device for transferring the toner to the sheet. The image forming unit 228 includes a developing unit, a transfer unit, a toner supply unit, and so on and transfers the toner on the photoconductor drum to the sheet. In the developing unit, the negatively charged toner is attached to the electrostatic latent image on the surface of the photoconductor drum from a developing cylinder to visualize the image. In the transfer unit, primary transfer and secondary transfer are performed. In the primary transfer, positive potential is applied to a primary transfer roller to transfer the toner on the surface of the photoconductor drum to a transfer belt. In the secondary transfer, positive potential is applied to the transfer roller to transfer the toner on the transfer belt to the sheet. The fixing unit 229 is a device for dissolving and fixing the toner on the sheet with heat and pressure and includes a heater, a fixing belt, a pressure belt, and so on. The paper feeding unit 230 is a device for feeding a sheet. A paper feeding operation and a paper conveying operation are controlled with rollers and various sensors in the paper feeding unit 230.

The configuration of the inserter 108 in the image forming apparatus 101 will now be described. The inserter 108 in the image forming apparatus 101 includes a communication I/F 232, a CPU 233, a memory 234, and a paper feeding controller 235, which are connected to each other via a bus 236. The communication I/F 232 is connected to the printing apparatus 107 via the communication cable 255 for communication necessary for the control. The CPU 233 executes a control program stored in the memory 234 to perform a variety of control necessary for the paper feed. The memory 234 is a storage device storing the control program. The paper feeding controller 235 controls feeding and conveyance of the sheet conveyed from a paper feeding unit in the inserter 108 and the printing apparatus 107 while controlling the rollers and sensors based on an instruction from the CPU 233.

The configuration of the inspection apparatus 109 in the image forming apparatus 101 will now be described.

The inspection apparatus 109 includes a communication I/F 237, a CPU 238, a memory 239, a shooting unit 240, a display unit 241, an operation unit 242, and an HDD 272, which are connected to each other via a bus 243. The communication I/F 237 is connected to the printing apparatus 107 via the communication cable 255 for communication necessary for the control. The reference image data used in the inspection is received from the printing apparatus 107 via the communication cable 255 and the communication I/F 237 and is stored in the HDD 272. The CPU 238 executes a control program stored in the memory 239 to perform a variety of control necessary for the inspection. The memory 239 includes a ROM and a RAM and stores the control program and so on.

The memory 239 desirably includes a large-capacity rewritable non-volatile memory in which the reference image data is registered.

The shooting unit 240 shoots the conveyed sheet based on an instruction from the CPU 238 to read the image printed on the sheet. The CPU 238 compares the image data resulting from the shooting by the shooting unit 240 with the reference image data stored in the memory 239 to determine whether the printed image is normal. The display unit 241 displays, for example, an inspection result and a setting screen. The operation unit 242 is operated by the user to accept instructions as to change of the settings in the inspection apparatus 109, registration of the reference image, and so on. The HDD 272 stores the reference image data. When the inspection apparatus 109 does not include the HDD 272, the reference image data may be stored in the HDD 221 in the printing apparatus 107 and may be read out from the HDD 221 into the memory 239 in the determination of whether the printed image is normal.

The configuration of the large capacity stacker 110 in the image forming apparatus 101 will now be described.

The large capacity stacker 110 includes a communication I/F 244, a CPU 245, a memory 246, and a paper discharge controller 247, which are connected to each other via a bus 248. The communication I/F 244 is connected to the printing apparatus 107 via the communication cable 255 for communication necessary for the control. The CPU 245 executes a control program stored in the memory 246 to perform a variety of control necessary for the paper discharge. The memory 246 includes a ROM, a RAM, and so on and stores the control program and so on.

The paper discharge controller 247 conveys the conveyed sheet to a stacking tray, an escape tray, or the downstream finisher 111 based on an instruction from the CPU 245.

The configuration of the finisher 111 in the image forming apparatus 101 will now be described.

The finisher 111 includes a communication I/F 249, a CPU 250, a memory 251, a paper discharge controller 252, and a finishing processor 253, which are connected to each other via a bus 254. The communication I/F 249 is connected to the printing apparatus 107 via the communication cable 255 for communication necessary for the control. The CPU 250 executes a control program stored in the memory 251 to perform a variety of control necessary for the finishing and the paper discharge. The memory 251 includes a ROM, a RAM, and so on and stores the control program and so on. The paper discharge controller 252 controls the conveyance and the discharge of the sheet based on an instruction from the CPU 250. The finishing processor 253 performs the finishing processing, such as the stapling, the punching, the saddle stitch bookbinding, and so on based on an instruction from the CPU 250.

Although the external controller 102 is connected to the image forming apparatus 101 via the internal LAN 105 and the video cable 106 in the above description, the external controller 102 may be connected to the image forming apparatus 101 only via the video cable as long as transmission and reception of the data necessary for the printing are available. It is sufficient for the memory 202, the memory 209, the memory 223, the memory 234, the memory 239, the memory 246, and the memory 251 to be storage devices for holding the data and the programs. For example, each memory may be replaced with, for example, a volatile RAM, a non-volatile ROM, a built-in HDD, an external HDD, a universal serial bus (USB) memory, or the like.

Figure 3:
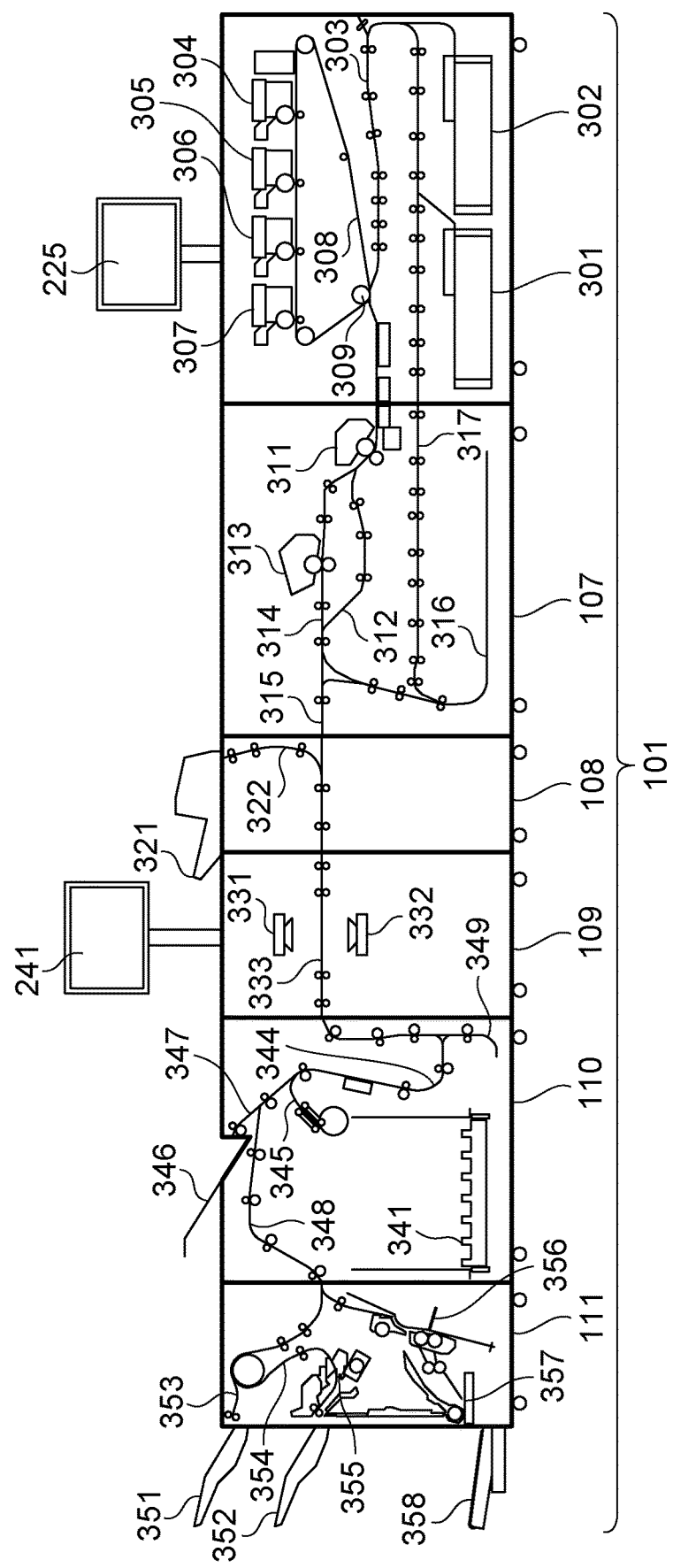
FIG. 3 is a schematic cross-sectional view for describing mechanisms in the image forming apparatus according to the present embodiment.

FIG. 3 is a schematic cross-sectional view for describing mechanisms in the image forming apparatus 101 according to the present embodiment.

First, the printing apparatus 107 will now be described. Paper feed decks 301 and 302 are capable of loading multiple sheets of various kinds. Each paper feed deck isolates the top sheet from the loaded sheets to convey the isolated sheet to a sheet conveying path 303. Information about the loaded sheets (the sheet size and the sheet type) is capable of being set in each paper feed deck from the operation unit 224 in the printing apparatus 107.

The respective developing stations 304 to 307 form the toner images using color toner of Y, M, C, and K to form a color image. The toner images formed here are primarily transferred to an intermediate transfer belt 308. The intermediate transfer belt 308 is rotated and driven clockwise in FIG. 3 and the toner images are transferred to the sheet conveyed from the sheet conveying path 303 at a secondary transfer position 309. The display unit 225 displays the printing status and information for settings in the image forming apparatus 101. A fixing unit 311 fixes the toner images on the sheet to the sheet. The fixing unit 311 includes a pressure roller and a heat roller. Passing of the sheet having the toner images transferred thereon between the rollers fuses and pressure-bonds the toner to fix the toner images on the sheet.

The sheet passing through the fixing unit 311 is conveyed to a conveying path 315 through a sheet conveying path 312. When the fusion and the pressure bonding are further required for the fixing depending on the type of the sheet, the sheet passing through the fixing unit 311 is conveyed to a second fixing unit 313 through the upper-side sheet conveying path. The sheet subjected to the additional fusion and pressure bonding in the second fixing unit 313 is conveyed to the conveying path 315 through a sheet conveying path 314. When the image formation mode is duplex printing, the sheet after the fixing is conveyed to the sheet conveying path 314 and is inverted in an inversion portion 316. The inverted sheet is conveyed to a double-sided conveying path 317. The image is transferred to the second face of the sheet at the secondary transfer position 309.

The configuration of the inserter 108 for inserting a sheet will now be described.

The inserter 108 include an inserter tray 321. The sheet fed from the inserter tray 321 via a sheet conveying path 322 is conveyed to the conveying path 315. This enables the sheet to be inserted into the sheet group conveyed from the printing apparatus 107 at an arbitrary position and to be conveyed to the downstream apparatuses.

The sheet passing through the inserter 108 is conveyed to the inspection apparatus 109. Cameras 331 and 332 are arranged in the inspection apparatus 109 so as to be opposed to each other. The camera 331 is a camera for shooting the upper surface of the sheet and the camera 332 is a camera for shooting the lower surface of the sheet. The inspection apparatus 109 is capable of reading the image on the sheet using the cameras 331 and 332 at a timing when the sheet conveyed to a sheet conveying path 333 reaches a certain position to determine whether the image printed on the sheet is normal. The inspection result in the inspection apparatus 109 and so on are displayed in the display unit 241.

The configuration of the large capacity stacker 110 capable of loading large amounts of sheets will now be described.

The large capacity stacker 110 includes a stacking stray 341 as a tray for loading the sheets. The sheet passing through the inspection apparatus 109 is input into the large capacity stacker 110 through a sheet conveying path 344. The sheet is loaded in the stacking stray 341 from the sheet conveying path 344 via a sheet conveying path 345. The large capacity stacker 110 further includes an escape tray 346 as the paper discharge tray. The escape tray 346 is a paper discharge tray used for discharging the sheet determined to be a defect sheet by the inspection apparatus 109. In the discharge into the escape tray 346, the sheet is conveyed from the sheet conveying path 344 to the escape tray 346 through a sheet conveying path 347. In the conveyance of the sheet to the post-processing apparatus downstream of the large capacity stacker 110, the sheet is conveyed through a sheet conveying path 348. An inversion portion 349 is a mechanical portion for inverting the sheet. The inversion portion 349 is used when the sheet is loaded in the stacking stray 341. When the sheet is loaded in the stacking stray 341 so that the orientation of the input sheet coincides with the orientation of the sheet at the output timing, the sheet is inverted once in the inversion portion 349. Since the sheet is discharged without flip in the loading when the sheet is conveyed to the escape tray 346 or the subsequent post-processing apparatus (the finisher 111), the inversion operation of the sheet by the inversion portion 349 is not performed.

The finisher 111 is capable of performing post-processing to the conveyed sheet in accordance with a function specified by the user. Specifically, the finisher 111 has finishing functions of the stapling (one-portion stapling or two-portion stapling), the punching (two holes or three holes), the saddle stitch bookbinding, and so on. The finisher 111 includes two paper discharge trays 351 and 352. The sheet bundle subjected to the finishing processing is fed to the paper discharge tray 351 through a sheet conveying path 353. When the finishing processing, such as the stapling, is performed, the sheet that is fed is conveyed to a processor 355 through a sheet conveying path 354, is subjected to the finishing function specified by the user, and is fed to the paper discharge tray 352. Each of the paper discharge trays 351 and 352 is capable of going upward and downward. The sheet subjected to the finishing processing in the processor 355 is capable of being loaded in the paper discharge tray 351 with the paper discharge tray 351 being lowered. When the saddle stitch bookbinding is specified, the sheet bundle is subjected to the stapling at its center in a saddle stitch processor 356, is half-folded, and is fed to a saddle stitch binding tray 358 through a sheet conveying path 357. The saddle stitch binding tray 358 has a belt conveyor configuration and the saddle stitch binding bundle loaded on the saddle stitch binding tray 358 is conveyed to the left side in FIG. 3.

FIG. 4 is a flowchart for describing a registration process of the reference image data in an inspection apparatus in the related art.

Here, the registration of the reference image data is performed to inspect a print printed in the image forming apparatus. In the inspection, the reference image data is registered in the HDD in the inspection apparatus in advance, the image on the sheet is read using two cameras, and the image that is read is compared with the reference image data to determine whether the image printed on the sheet is normal. In the registration of the reference image data in the related art, the printed sheet resulting from the actual printing is read using the cameras and the image data that is read is registered as the reference image data.

Referring to FIG. 4, in Step S401, the setting mode of the inspection apparatus, which is set by an operator, is accepted from the operation unit. Upon acceptance of the setting mode, the inspection apparatus is in a registration mode of the reference image data (the reference image). Since the reference image data read by the two cameras is used in the registration mode in the related art, the inspection apparatus is in a standby state in which the inspection apparatus waits for the conveyance of the sheet to the sheet conveying path. In Step S402, the print instruction is accepted from the PC. The print instruction accepted here is printing of one copy of the print job which the operator wants to print. In Step S403, the print job is executed and the reference image is printed on the sheet based on the image data. In addition, the printed sheet is read by the cameras and scanned image data that is read is stored in the HDD. The operator visually confirms the printed sheet or an image preview displayed in the display unit to confirm whether the scanned image data is appropriate as the reference image. In Step S404, it is determined whether the registration of the reference image data is accepted. If the registration of the reference image data is accepted (YES in Step S404), the registration process illustrated in FIG. 4 is terminated. If the registration of the reference image data is not accepted (NO in Step S404), the process goes back to Step S401.

At this time, the operator cleans the image forming apparatus, changes the setting of the print job, and so on so that the printed sheet or the image preview displayed in the display unit is capable of being registered as the reference image data.

Since the printing is performed and the reference image data is input using the same method as for the image to be inspected in the registration of the reference image data in the related art, it is not necessary to consider the size, the direction, and so on of the image and the inspection is capable of being performed through the simple image comparison. However, if the print job has a large number of pages, it is necessary for the operator to visually determine whether all the pages are appropriate as the reference image data. Accordingly, there are problems in that any confirmation error may occur and it takes a lot of time for the confirmation.

In the present embodiment, the image data that is rasterized is registered as the reference image data instead of the registration of the reference image data through printing and scanning.

Figure 10:
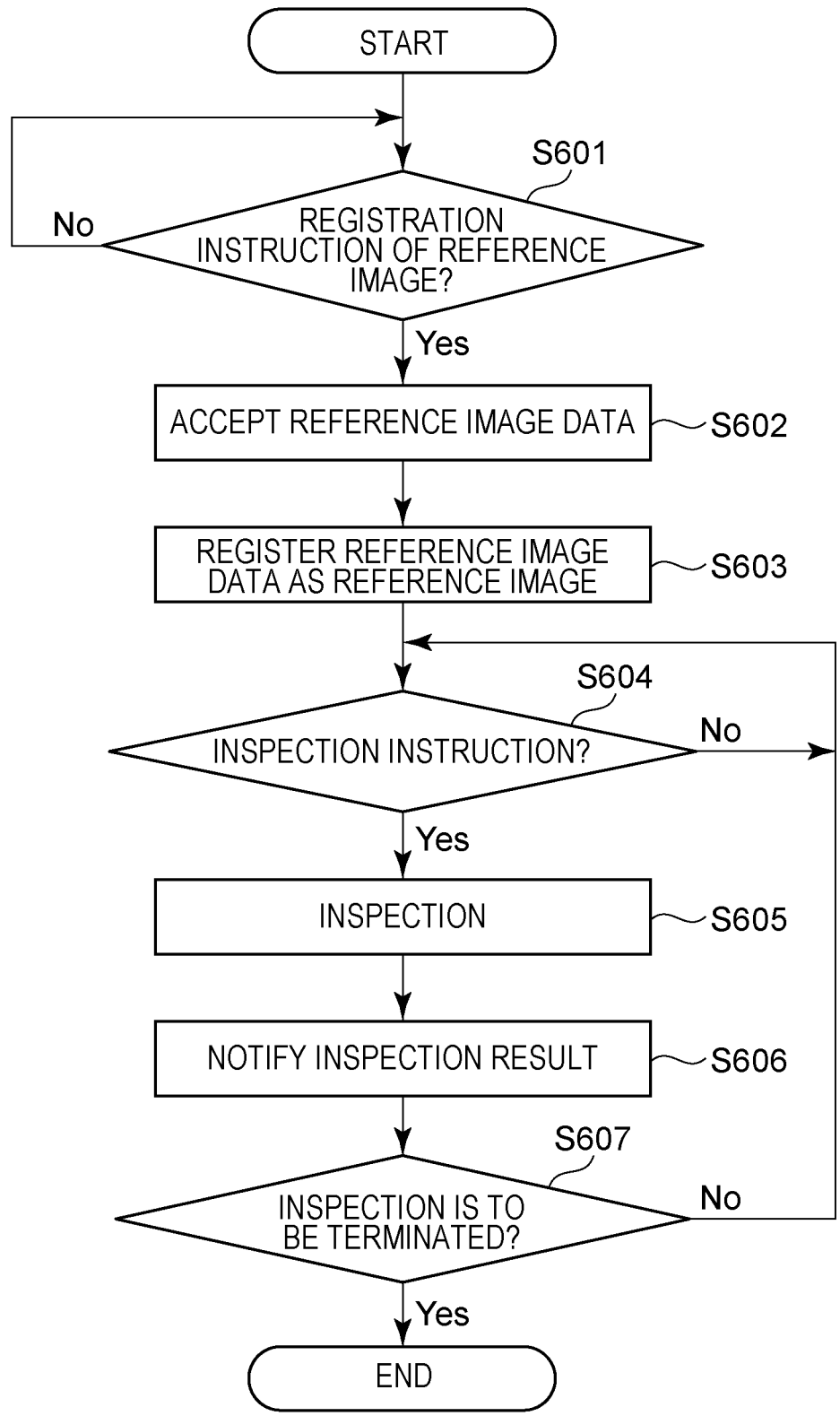
FIG. 10 is a flowchart illustrating a process performed by an inspection apparatus according to the present embodiment.

FIG. 10 is a flowchart for describing a process performed by the inspection apparatus 109 according to the present embodiment. The process illustrated in the flowchart is achieved by the CPU 238 in the inspection apparatus 109, which executes the program decomposed in the memory 239.

Referring to FIG. 10, in Step S601, the CPU 238 waits for reception of a registration instruction of the reference image data (the reference image) from the printing apparatus 107. If the registration instruction is received (YES in Step S601), the process goes to Step S602. In Step S602, the CPU 238 sets the inspection apparatus 109 to the registration mode of the reference image and receives the reference image data transmitted from the printing apparatus 107. The setting of the inspection apparatus 109 to the registration mode of the reference image may be performed by, for example, the operator with the operation unit 242.

In Step S603, the CPU 238 registers the received reference image data as the reference image. In Step S604, the CPU 238 waits for reception of an inspection instruction from the printing apparatus 107. If the inspection instruction is received (YES in Step S604), the process goes to Step S605. In Step S605, the CPU 238 reads the sheet to be inspected, which is printed in and conveyed from the printing apparatus 107, with the cameras 331 and 332 and stores the scanned image data that is read in the HDD 272. Then, the scanned image data of the sheet to be inspected is compared with the reference image data registered in Step S603 for the inspection. In Step S606, the CPU 238 notifies the printing apparatus 107 of the inspection result. In Step S607, the CPU 238 determines whether a termination notification of the inspection process is received from the printing apparatus 107. If the termination notification is not received (NO in Step S607), the process goes back to Step S604. If the termination notification is received (YES in Step S607), the process illustrated in FIG. 10 is terminated.

Figure 5A:
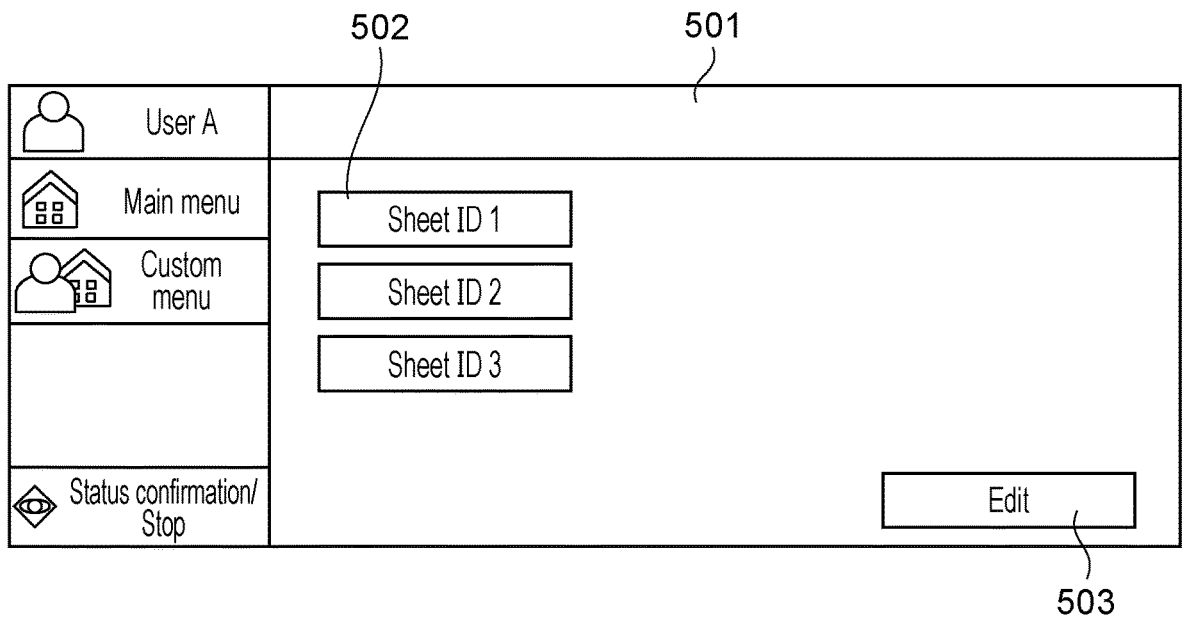
FIG. 5A and FIG. 5B illustrate an example of a sheet attribute setting screen in the image forming apparatus.
Figure 5B:
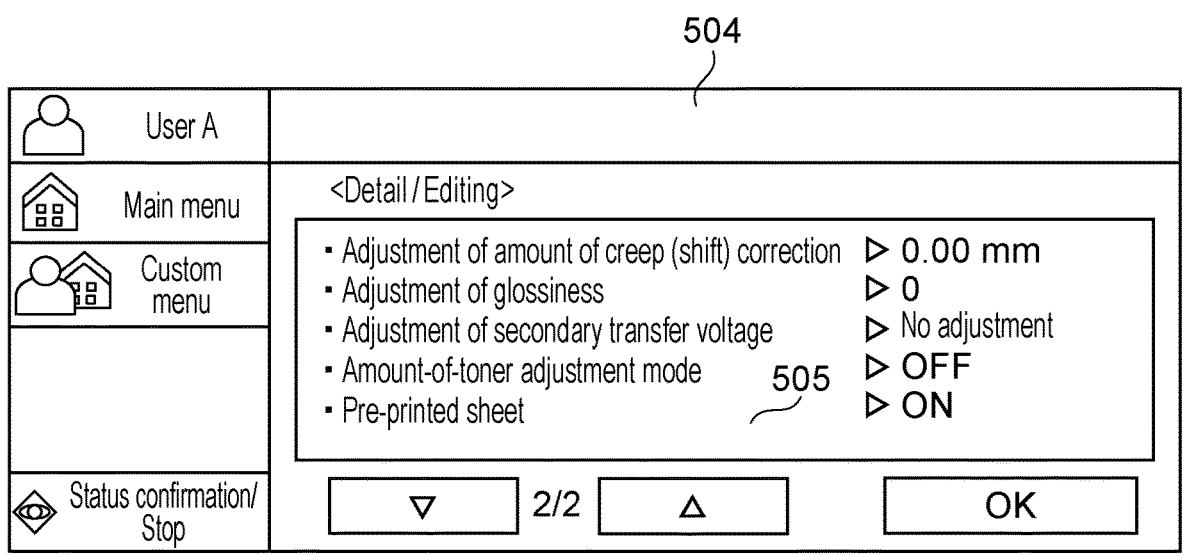

FIG. 5A illustrates an example of a sheet attribute editing screen 501, which is displayed in the operation unit 224 in response to an instruction from the CPU 222 in the printing apparatus 107. Editable sheet identifiers (IDs) are displayed on the sheet attribute editing screen 501. Selection of a sheet ID 1 502 and an Edit button 503 changes the sheet attribute editing screen 501 to a sheet attribute setting screen 504 illustrated in FIG. 5B. The value of each sheet attribute is capable of being varied on the sheet attribute setting screen 504. A pre-printed sheet attribute 505 is an attribute indicating whether the sheet is a pre-printed sheet.

When the pre-printed sheet attribute 505 is set to ON, the printing through the conveying path for the duplex printing is performed so that the print surface of the printing coincides with the print surface of the pre-printed sheet in the configuration of the conveying path. The pre-printed sheet is a sheet on which the page number, characters, ruled lines, and so on are printed in advance.

Figure 6A:
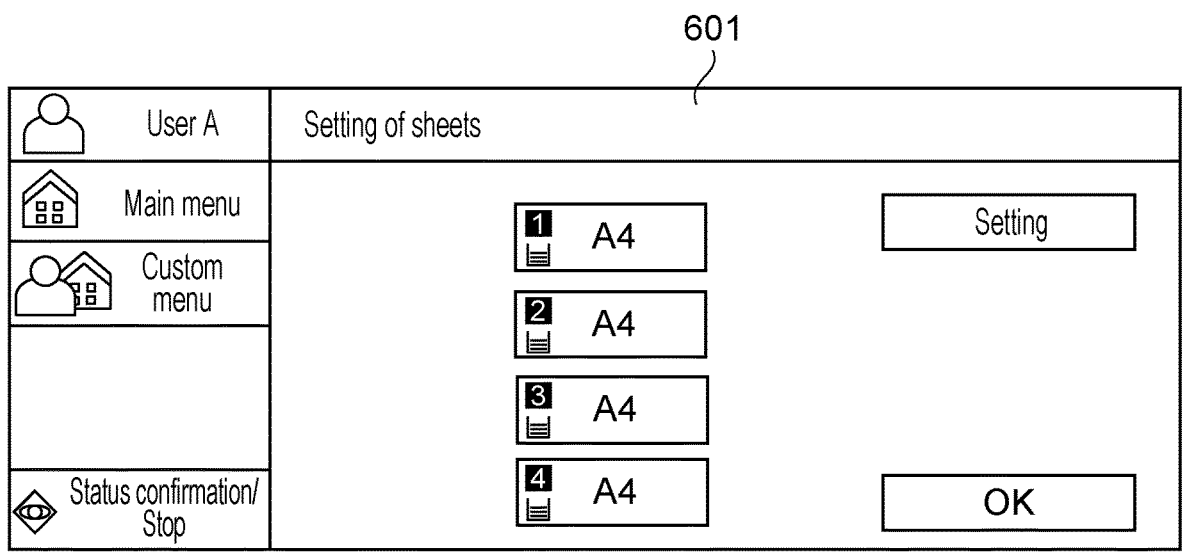
FIG. 6A and FIG. 6B illustrate an example of a sheet setting screen in the image forming apparatus.
Figure 6B:
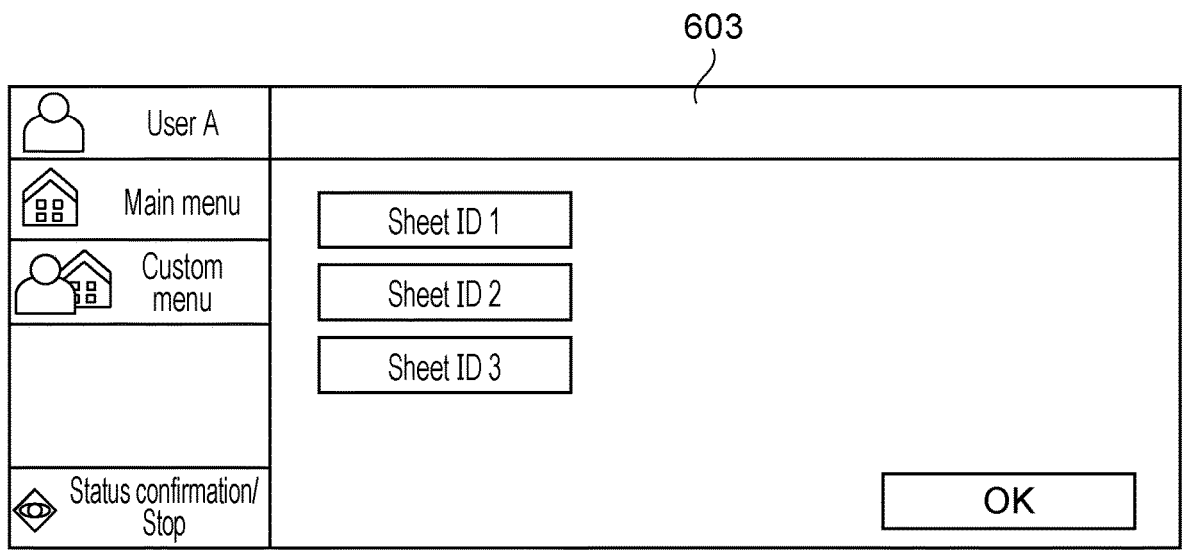

FIG. 6A illustrates an example of a sheet setting screen 601 for paper cassettes, which is displayed in the operation unit 224 in response to an instruction from the CPU 222 in the printing apparatus 107. The current setting of each paper cassette is displayed on the sheet setting screen 601. The sheet ID of each paper cassette is capable of being varied on a Sheet ID setup screen 603 illustrated in FIG. 6B.

FIG. 7 is a flowchart illustrating a reference image registration (hereinafter referred to as RIP inspection) process of print settings including the sheet attributes, described above with reference to FIG. 5A and FIG. 5B, in the printing apparatus 107. The process illustrated in the flowchart in FIG. 7 is achieved by the CPU 222 in the printing apparatus 107, which sequentially reads out the programs stored in the HDD 272 and so on into the memory 223 to execute the programs that are read out and decomposed.

In the registration of the reference image in the present embodiment, the image data generated from the rasterized image data (raster data) is registered, as described above with reference to FIG. 10, instead of the reading of the printed sheet, as described above with reference to FIG. 4. Although the example is described in the present embodiment, in which the rasterized image data is received from the external controller 102 through the video cable 106, the rasterized image data is not limited to the above case. For example, the image forming apparatus 101 may rasterize the print job (for example, including PDL data) received from the client PC 103.

After the printing apparatus 107 transmits the reference image to the inspection apparatus 109 in Steps S701 to S705 and Step S707 in FIG. 7, the inspection apparatus 109 registers the reference image (the reference image) in Steps S601 to S603 in FIG. 10.

Referring to FIG. 7, in Step S701, the setting instruction of the reference image data in the inspection apparatus 109, which is input by the operator with the operation unit 242, is accepted. The inspection apparatus 109 is set to the registration mode of the reference image. The inspection apparatus 109 waits for reception of the rasterized image data from the external controller 102 via the video cable 106.

In Step S702, the printing apparatus 107 receives the print job to be inspected and the print instruction from the client PC 103. Although the printing of the print job to be inspected is not performed before the reference image is registered in the inspection apparatus 109, the print instruction is received in Step S702. The print settings at least including the size of the sheet to be printed, the type of the sheet to be printed, the resolution, the orientation of the image, and the image size of each page and the image data are included in the print job. The print instruction received in Step S702 is printing of one copy of the print job to be inspected, which the operator wants to inspect. Although the print instruction is accepted in the present embodiment so as to match the user-friendliness with that in the related art, an instruction to register the print job as a reference image registration job may be received from the client PC 103. The print instruction may be received from the external controller 102.

In Step S703, the printing apparatus 107 selects the paper cassette to which the sheet is fed based on the specification of the sheet type, which is included in the print job.

Figure 8:
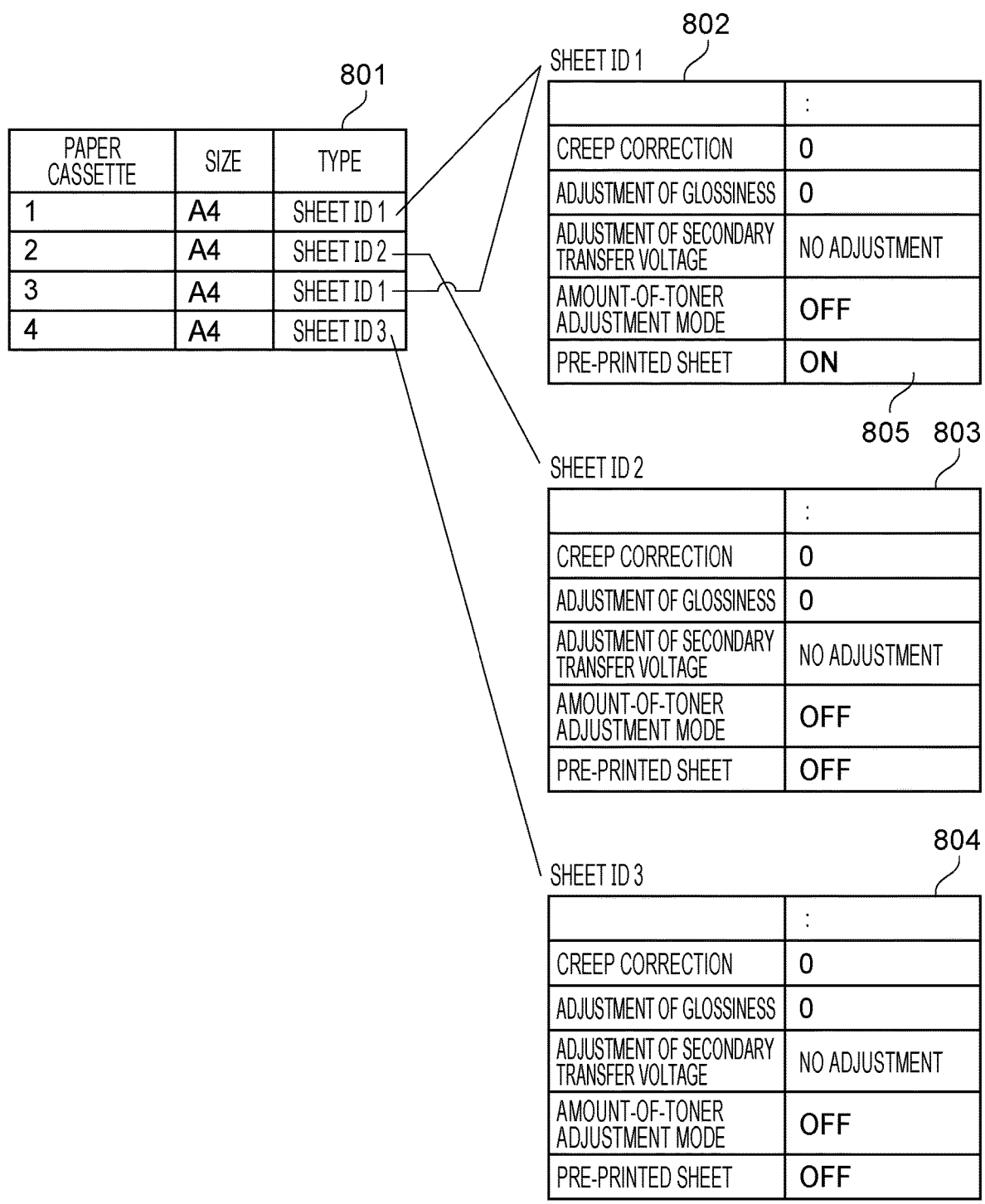
FIG. 8 illustrates the data structure of paper cassettes and sheets types.

In Step S704, the printing apparatus 107 acquires the sheet attributes of the sheets loaded in the selected paper cassette. The correspondence between the paper cassettes and the sheet attributes in the acquisition of the sheet attribute will now be described with reference to FIG. 8. The data structure in which the respective paper cassettes are associated with the sheet types, indicated by reference numeral 801, is stored in the memory 223 or the HDD 272. Specifically, in the data structure stored in the memory 223 or the HDD 272, each paper cassette has the sheet ID, such as the sheet ID 1, the sheet ID 2, or the sheet ID 3, and sheet attribute values 802, 803, and 804 are associated with the respective sheet IDs. A pre-printed sheet attribute 805 is associated with each sheet ID. The attribute values are capable of being varied on the sheet attribute setting screen 504 illustrated in FIG. 5B. The sheet attributes may be acquired based on the specification of the sheet type included in the print job without the selection of the paper cassette in Step S703.

In Step S705, the printing apparatus 107 determines whether the pre-printed sheet attribute, among the sheet attributes acquired in Step S704, it set to ON. If the pre-printed sheet attribute is set to ON (YES in Step S705), the process goes to Step S706. If the pre-printed sheet attribute is set to OFF (NO in Step S705), the process goes to Step S707.

In Step S706, the printing apparatus 107 displays a message, illustrated in FIG. 9, indicating that the RIP inspection is unavailable. The printing apparatus 107 further displays a message or the like to lead to the process to register the read image as the reference image data (the flowchart illustrated in FIG. 4) on the display 212 in the external controller 102. The message illustrated in FIG. 9 may indicate that the pre-printed sheet is unavailable in the inspection process. The message illustrated in FIG. 9 may be displayed in the operation unit 242 in the inspection apparatus 109.

The paper cassette for which the pre-printed sheet attribute is set to ON may be grayed out in Step S703 to cause the paper cassette not to be selected, and Steps S704, S705, and S706 may be skipped.

In Step S707, the printing apparatus 107 performs a layout process for the printing to the image data input from the external controller 102 via the video cable 106 and, then, transmits the image data subjected to the layout process to the inspection apparatus 109 via the communication cable 255. The inspection apparatus 109 registers the image data in the memory 239 as the reference image. In other words, the reference image (the reference image) is an image resulting from the layout process for the printing to the image data input from the external controller 102.

In the present embodiment, when the pre-printed sheet is specified for the printing of the inspection job in the inspection process (the RIP inspection) to register the image data received from the printing apparatus as the reference image data, the message indicating that the RIP inspection is unavailable is displayed. In addition, the message or the like to prompt the process to register the read image as the reference image data is displayed. Accordingly, it is possible to prevent the normal image printed on the pre-printed sheet from being determined to be abnormal.

According to the present disclosure, it is possible to prevent the inspection result from being determined not to be normal in the inspection of the print job using the pre-printed sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156317, filed Sep. 27, 2021, which is hereby incorporated by reference herein in its entirety.

What is claimed is:

1. An inspection system comprising:
   one or more processors; and
   at least one memory storing executable instructions, which when executed by the one or more processors, cause the inspection system to:
      receive a print job including a sheet attribute and image data, the sheet attribute indicating whether a sheet is a pre-printed sheet on which information has been printed before printing in accordance with the print job is performed;
      register a reference image based on the received image data in a case where the sheet attribute does not indicate the pre-printed sheet; and
      determine whether an image that is printed on the sheet in accordance with the print job and that is read is normal based on the registered reference image,
      wherein, if the sheet attribute indicates the pre-printed sheet, control is performed so as not to register the reference image based on the received image data.

2. The inspection system according to claim 1, further comprising:
   a display,
   wherein, if the sheet attribute indicates the pre-printed sheet, unavailability of the pre-printed sheet is displayed on the display.

3. The inspection system according to claim 1, wherein the reference image is generated by performing a layout process for printing to the image data.

4. The inspection system according to claim 1, wherein a printing apparatus conveys the sheet on which the image is printed to an inspection apparatus, and the inspection apparatus inspects the image on the sheet conveyed from the printing apparatus.

5. The inspection system according to claim 1, wherein, if the sheet attribute indicates the pre-printed sheet, control is performed so as not to select a paper cassette to which the pre-printed sheet is fed.

6. A method of controlling an inspection system, the method comprising:
   receiving, by a printing apparatus, a print job including a sheet attribute and image data, the sheet attribute indicating whether a sheet is a pre-printed sheet on which information has been printed before printing in accordance with the print job is performed;
   registering, by an inspection apparatus, a reference image based on the received image data in a case where the sheet attribute does not indicate the pre-printed sheet; and
   determining, by the inspection apparatus, whether an image that is printed on the sheet in accordance with the print job and that is read is normal based on the registered reference image,
   wherein, if the sheet attribute indicates the pre-printed sheet, control is performed so as not to register the reference image based on the received image data.

7. The method according to claim 6, wherein the inspection system includes a display, and
   wherein, if the sheet attribute indicates the pre-printed sheet, unavailability of the pre-printed sheet is displayed on the display.

8. The method according to claim 6, wherein the reference image is generated by performing a layout process for printing to the image data.

9. The method according to claim 6, wherein the printing apparatus conveys the sheet on which the image is printed to the inspection apparatus, and the inspection apparatus inspects the image on the sheet conveyed from the printing apparatus.

10. The method according to claim 6, wherein, if the sheet attribute indicates the pre-printed sheet, control is performed so as not to select a paper cassette to which the pre-printed sheet is fed.

11. A non-transitory computer-readable medium storing a program including instructions, which when executed by one or more processors of the inspection system, cause the inspection system to perform the method according to claim 6.

12. A printing apparatus comprising:
   one or more processors; and
   at least one memory storing executable instructions, which when executed by the one or more processors, cause the printing apparatus to:
      receive a print job including a sheet attribute and image data, the sheet attribute indicating whether a sheet is a pre-printed sheet on which information has been printed before printing in accordance with the print job is performed; and
      if the sheet attribute does not indicate the pre-printed sheet, transmit a reference image to an inspection apparatus based on the received image data,
      wherein, if the sheet attribute indicates the pre-printed sheet, control is performed so as not to transmit the reference image based on the received image data to the inspection apparatus.

13. An inspection apparatus comprising:
   one or more processors; and
   at least one memory storing executable instructions, which when executed by the one or more processors, cause the inspection apparatus to:

receive image data from a printing apparatus, wherein the image data is included in a print job including a sheet attribute indicating whether a sheet is a pre-printed sheet on which information has been printed before printing in accordance with the print job is performed;

register a reference image based on the received image data in a case where the sheet attribute does not indicate the pre-printed sheet; and determine whether an image that is printed on the sheet in accordance with the print job and that is read is normal based on the registered reference image, wherein, if the sheet attribute indicates the pre-printed sheet, control is performed so as not to register the reference image based on the received image data.

* * * * *